(12) United States Patent
Metzler et al.

(10) Patent No.: US 9,898,821 B2
(45) Date of Patent: Feb. 20, 2018

(54) DETERMINATION OF OBJECT DATA BY TEMPLATE-BASED UAV CONTROL

(71) Applicant: HEXAGON TECHNOLOGY CENTER GMBH, Heerbrugg (CH)

(72) Inventors: Bernhard Metzler, Dornbirn (AT); Knut Siercks, Mörschwil (CH); Elmar Vincent Van Der Zwan, Altstätten (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 22 days.

(21) Appl. No.: 15/053,935

(22) Filed: Feb. 25, 2016

(65) Prior Publication Data
US 2016/0253808 A1 Sep. 1, 2016

(30) Foreign Application Priority Data
Feb. 26, 2015 (EP) .................................. 15156719

(51) Int. Cl.
| | |
|---|---|
| G06K 9/00 | (2006.01) |
| G06T 7/00 | (2017.01) |
| B64C 39/02 | (2006.01) |
| G01C 15/00 | (2006.01) |
| G05D 1/00 | (2006.01) |
| G06T 17/05 | (2011.01) |
| G06T 7/73 | (2017.01) |
| G06T 7/593 | (2017.01) |

(52) U.S. Cl.
CPC ............ *G06T 7/0046* (2013.01); *B64C 39/02* (2013.01); *B64C 39/024* (2013.01); *G01C 15/00* (2013.01);
(Continued)

(58) Field of Classification Search
CPC .................................................... G06T 7/0046
See application file for complete search history.

(56) References Cited

U.S. PATENT DOCUMENTS 8,948,935 B1 * 2/2015 Peeters ................. B64C 39/024
701/3
2014/0316616 A1 * 10/2014 Kugelmass ............ G05D 1/101
701/8
(Continued)

FOREIGN PATENT DOCUMENTS

| CA | 2 832 956 A1 | 10/2012 |
|---|---|---|
| EP | 1 903 303 B1 | 12/2012 |

(Continued)

OTHER PUBLICATIONS

Corrigan et al. "Drone Technology, Knowledge, News & Reviews" www.dronezone, Nov. 30, 2014.*
(Continued)

*Primary Examiner* — Oneal R Mistry
(74) *Attorney, Agent, or Firm* — Maschoff Brennan

(57) ABSTRACT

A Method for providing information about an object using an unmanned aerial vehicle with a data acquisition unit is disclosed according to some embodiments of the invention. The method may include determining positional data with reference to the object, the positional data being referenced to a measuring coordinate system, providing a digital template regarding the object, the template at least partly representing the object in coarse manner, and referencing the template with the positional data so that the template corresponds as to its spatial parameters to the object in the measuring coordinate system.

22 Claims, 10 Drawing Sheets

(52) U.S. Cl.
CPC .............. *G05D 1/00* (2013.01); *G06T 7/593* (2017.01); *G06T 7/75* (2017.01); *G06T 17/05* (2013.01); *B64C 2201/12* (2013.01); *B64C 2201/14* (2013.01); *G06T 2207/10021* (2013.01); *G06T 2207/10028* (2013.01); *G06T 2207/10032* (2013.01); *G06T 2207/30181* (2013.01)

(56) References Cited

U.S. PATENT DOCUMENTS

| 2016/0313736 | A1* | 10/2016 | Schultz | B64D 47/08 |
| 2017/0031369 | A1* | 2/2017 | Liu | G05D 1/102 |
| 2017/0045895 | A1* | 2/2017 | Wang | G05D 1/101 |
| 2017/0108877 | A1* | 4/2017 | Zang | G05D 1/12 |

FOREIGN PATENT DOCUMENTS

| EP | 2 818 958 A2 | 12/2014 |
| FR | 2 807 603 A1 | 10/2001 |

OTHER PUBLICATIONS

Extended European Search Report dated Oct. 2, 2015 as received in Application No. 15156719.5.

* cited by examiner

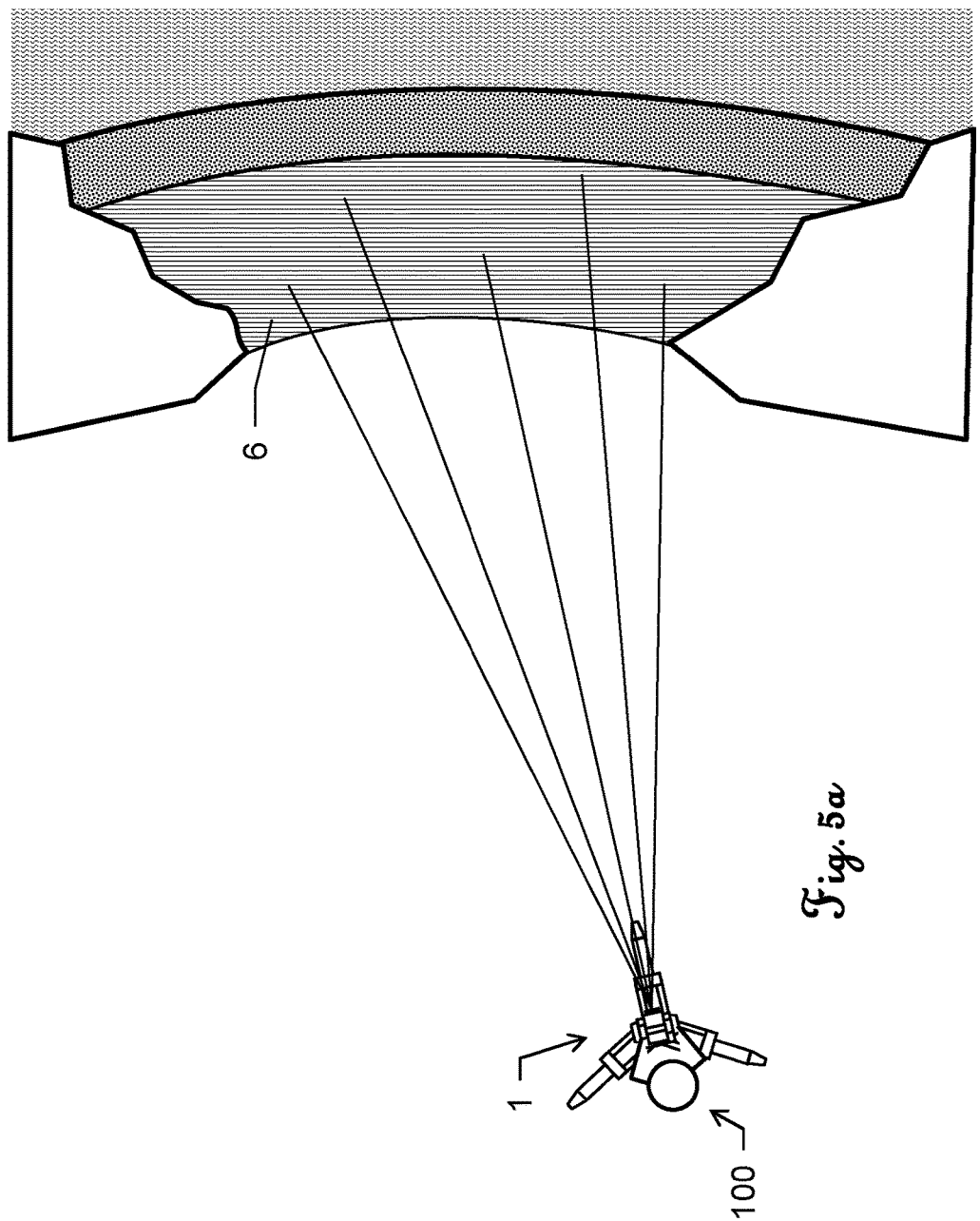

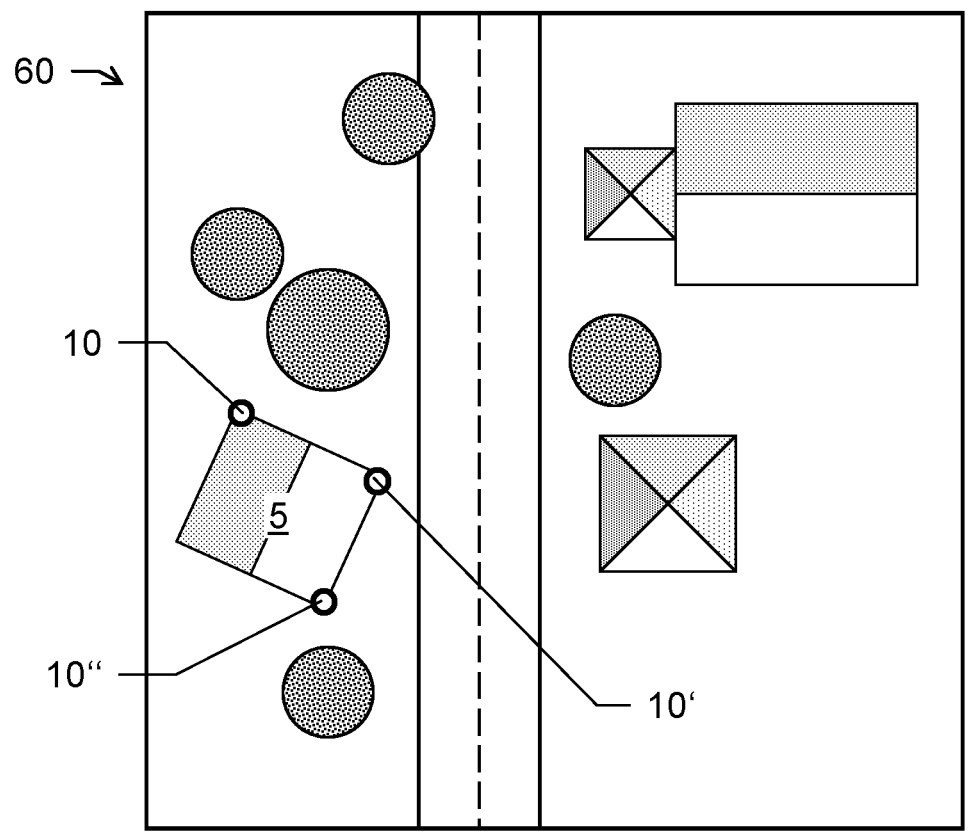
Fig. 13a
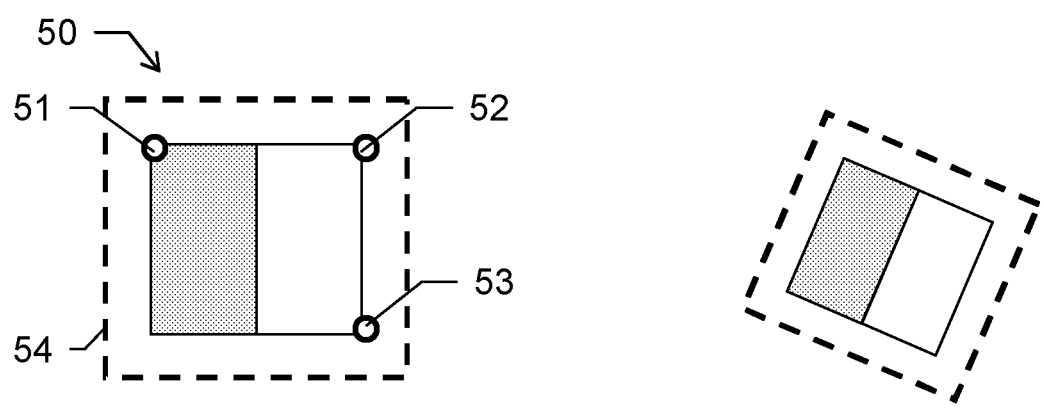
Fig. 13b
Fig. 13c

DETERMINATION OF OBJECT DATA BY TEMPLATE-BASED UAV CONTROL

FIELD

The present invention generally pertains to a method for geodetic surveying of an object using a geodetic surveying instrument and an unmanned aerial vehicle (UAV), wherein surveying data is gathered by a capturing unit on side of the UAV.

BACKGROUND

For gathering precise surface-related information about an object, particularly topographical information, the surface of such object typically may be scanned using a laser beam which is moved over the object in a predefined manner and/or may be imaged using a camera unit in combination with a stereoscopic approach. Those methods for instance are provided by a geodetic measuring device like a terrestrial laser scanner or a total station, e.g. Leica P20 or Leica Multi Station 50, or by specified camera units. By scanning the object and by applying the stereoscopic method a so called (3D-) point cloud or an overall image may be created representing the object.

Such point cloud typically is derived by determining a distance for each measuring point and a correlated direction of the laser beam when determining the distance (laser scanner). The point-to-point resolution of such measuring points and the resulting point cloud, respectively, is defined by the speed of moving the laser beam on the surface and a triggering-interval for triggering single measurements (e.g. one for each measuring point).

Alternatively, parts of the point cloud are calculated from at least two images the stereo basis and the relative pose of which are known. Of course, the point cloud could be calculated based on a series of images. As a result of such stereoscopic calculations, the derived point cloud represents the surface of the object with corresponding point-to-point resolution.

In case of using a geodetic measuring device, as from one station point usually only a part of an object is measurable while other surface points are hidden, it becomes necessary to set up the measuring devices at least at two different positions with respect to the object such that in combination the whole surface of the object is measurable.

The surveying instrument needs direct line-of-sight to the object points to measure. In case of an obstruction, e.g. a tree in front of a building which occludes a part of the façade leads to a so called "scanning shadow". In practice, in such a case the surveying instrument also is set up at a different position where direct line-of-sight to the missing parts is given. Therefore, more than one setup of the surveying instruments is needed and each additional setup takes time and reduces the productivity of the user.

Moreover, a full-dome-scan, i.e. a scanning area from 0° to 360° in horizontal and −45° to 90° in vertical direction, with a terrestrial laser scanner in highest resolution may take up to several hours. In this resolution the distance between the points in 100 meters is 1.0 mm. For every new setup of the instrument a full 360° panorama image is usually obtained which also takes several minutes. Thus, relocating a laser scanner or a similar surveying instrument (e.g. total station) and recording a second set of measuring data (second point cloud) is very time consuming and needs an expert at least for referencing the first point cloud relative to the second point cloud.

In case of measuring an object with a portable image capturing unit, data acquisition may be provided in a more flexible and faster manner. However, there still would remain regions at the object not being accessible with view to gathering corresponding adequate image data, e.g. high above the surface or of terrain which is difficult to access. Moreover, in order to reference the image data in a global coordinate system and to provide precise object information, particularly each capturing position would have to be assigned to a correspondingly captured image.

A further approach for gathering object data is based on a combination of scanner data with image data.

EP 1 903 303 B1 discloses a method of combining point cloud data with image data in order to fill up missing parts of the point cloud. The camera unit is used for recording a set of images which are split into a set of stereoscopic image pairs. Every image pair is processed independently. Moreover, the panorama image obtained by a laser scanner (the so-called "main image") is used for pair wise matching with one stereoscopic image pair and thus providing adding dimensional information of the respective stereoscopic image pair to the point cloud. The whole process is performed in a post-processing step having all data of the set of images and the laser scanner ready for processing.

The main disadvantages of the methods above are on the one hand the huge amount of time being consumed with scanning the object and—on the other hand—remaining areas of the object which cannot be accessed in suitable manner, i.e. caused by obstacles in the line of sight of the scanner, or gathering images with recommended properties which cover all regions of interest, e.g. the roofs of buildings. Moreover, with respect to combining scanner data with image data, due to the post-processing and due to the independent processing of the stereoscopic images an error concerning the accuracy of point positions increases with the number of images not being directly related to the scanning point cloud.

In addition, above methods require quite intense manual settings and implementations (e.g. moving the camera or post-processing of data) and thus are prone to errors, require highly educated operators and consume relative much time.

As to a further aspect regarding determination of topographic data of terrain, a UAV is known to be used for that. Flight plans for such UAVs are mostly generated by selecting a terrain-area of interest, e.g. from a map, and define a particular altitude. A horizontal rectangle at the specified altitude is defined and provides for the borders for a resulting flight path. The flight path may be defined such that it covers the desired area of interest, wherein the acquisition of image data is set for providing a lateral overlap of the captured images regarding the respectively covered regions. The points of image acquisition are thus defined accordingly (depending on a required longitudinal overlap).

The precision of position information derived from such aerial images correlates with the ground sampling distance (GSD) (=distance on the ground which corresponds to e.g. one pixel in a captured image) and strongly depends on the altitude. The more distance is in between the UAV and the surface of the terrain, the larger the ground sampling distance, and the less precise the position data is. However, by reducing that distance also the danger of colliding with any kind of obstacle, e.g. trees, buildings and/or hills, rises accordingly. Moreover, such method of capturing images typically relates to capturing images from above and thus does not satisfactorily provide for gathering image data from vertical parts of the object.

SUMMARY

Some embodiments of the invention provide a measuring method and a corresponding system which enables to precisely measure an object with improved flexibility with respect to properties (e.g. size and shape) of the object and with relatively low time consumption.

Some embodiments of the invention provide surveying of a respective object in (largely) automated manner.

Some embodiments of the invention provide a workflow being comparatively simple at least for persons skilled in operating a surveying instrument.

Some embodiments of the invention may be based on the idea of using measurement data provided by a terrestrial model or by a measurement with a surveying instrument, e.g. a total station, a terrestrial laser scanner or GNSS sensor, to generate and/or adapt a basic model of the object (template). This model is then used for planning of a flight path of an unmanned aerial vehicle (UAV) according to desired data acquisition points.

Some embodiments of the invention may relate to a method for providing information about an object using an unmanned aerial vehicle (UAV) with a data acquisition unit. The method comprises determining positional data with reference to the object, the positional data being referenced to a measuring coordinate system, providing a digital template regarding the object, the template at least partly representing the object in coarse manner, in particular a size, shape and/or rough topography of the object, and referencing the template with the positional data so that the template corresponds as to its spatial parameters to the object in the measuring coordinate system.

Furthermore, some embodiments may include a spatial position of at least one data acquisition point or section related to the object is derived based on at least the positional data and/or the template. The unmanned aerial vehicle is controlled (i.e. the movement of the UAV is controlled) in a manner such that it approaches the at least one data acquisition point or section (e.g. along a measuring path). Moreover, object information as to at least a part of the object is acquired according to the at least one data acquisition point or section by triggering the data acquisition unit depending on fulfilling a defined distance criterion, the distance criterion defining a spatial relation between an actual position of the unmanned aerial vehicle and the at least one data acquisition point or section.

The positional data may be determined by measuring particular points at the object (e.g. by use of a total station) which represent the object in its entirety, particularly wherein assumptions concerning the object to be measured are considered for such determination, e.g. the object having flat and vertical walls. Furthermore, the positional data may be derived by using an image which was captured on side of a surveying instrument and a respective image processing algorithm.

A rough digital model or rough point cloud as well as a virtual body which represents the structure or shape of the object—both of which can be derived from the measured points (e.g. using a laser scanner) at the object and/or from images taken of the object—can be used as respective positional data.

A spatial position of the unmanned aerial vehicle (UAV) may additionally be referenced to the measuring coordinate system by use of e.g. a geodetic surveying instrument or a GNSS sensor at the UAV, wherein the unmanned aerial vehicle may comprise an image capturing unit. Therefore, the UAV is enabled to be controlled with respect to the positional data or the referenced template in one common coordinate system. In addition to referencing the position of the UAV also the orientation of the UAV may be referenced to the measuring coordinate system so that an orientation of the UAV relative to the positional data, the object and/or the referenced template is known.

The measurements, i.e. positional data, can be also transformed to a global coordinate system, e.g. the World Geodetic System 1984 (WGS84). Then, the control of the UAV can be carried out by use of a GNSS sensor integrated in the UAV.

Referencing the spatial position of the unmanned aerial vehicle may be performed by distance measurement to the UAV from a surveying instrument (which also provides for the positional data) knowing the direction of the measuring laser beam by respective angle measurements. Determining the orientation of the UAV may be provided by capturing an image of the UAV and processing the image for deriving the orientation of the UAV according to the image or by detecting the positions of particular features on side of the UAV (e.g. also by image processing). This may be done automatically and/or continuously while movement of the UAV.

According to the invention, an actual position (and particularly orientation) of the unmanned aerial vehicle (in the measuring coordinate system) may continuously be determined. This may be done using the measuring functionalities of the surveying instrument and/or by use of on-board sensors like an IMU (inertial measuring unit), gyroscope, tilt sensor, acceleration sensor and/or magnetic compass.

Concerning triggering of data acquisition, in other words, as soon as the UAV reaches the data acquisition point or section or a defined distance to such point or section (distance criterion) data (e.g. an image) of at least a part of the object is gathered. Alternatively, there is defined a zone around the data acquisition point/section and the data is acquired within the time interval while the UAV is moved through that zone or generally in case the UAV is located within the zone. Such acquisition may be triggered depending on the orientation of the UAV relative to a gravitational vector or to the object to be measured.

The distance criterion may define a region with relation to the data acquisition point or section. Thus, e.g. a region around the data acquisition point may be defined of spherical form and having a distance of about 5 cm to the point (tolerance distance to the point). As soon as the UAV reaches the sphere, data is acquired.

Of course, data acquisition (e.g. capturing the image or scanning a part of the object) may not only be triggered depending on the actual position of the UAV but also depending on an actual orientation of the UAV. For that, the movement of the UAV is controlled in such manner that the UAV is oriented in defined manner (preferably defined by the referenced template), particularly within a range of tolerance, relative to the object when reaching the defined spatial relation between the actual position of the unmanned aerial vehicle and the at least one data acquisition point or section, i.e. when fulfilling the distance criterion.

An UAV as to be understood in sense of the present invention may be embodied as a quad-copter, multi-copter or any other kind of remote-controllable drone, which preferable provides to be positioned in a hovering state at a basically fixed position.

In addition to above steps, a first measuring path can be derived based on the referenced template, in particular automatically (e.g. by applying a respective path-deriving algorithm), and the unmanned aerial vehicle is controlled in a manner such that it moves according to the first measuring path. The UAV can be controlled to fly along that first measuring path e.g. from one data acquisition point of the path to the next, wherein one or more images are captured with respect to each point.

In particular, path planning is performed based on the referenced template which results (in a measuring path and) in at least one data acquisition point (for e.g. capturing a single image) or a data acquisition section (for gathering video or scanning data).

The data acquisition point or the data acquisition section may be part of the measuring path, i.e. a point laying on the path or a section which corresponds to a segment of the path which both may enable to trigger a respective acquisition of data.

According to some embodiments of the invention the template is adaptable (preferably adapted in sense of the step of referencing) regarding its size and spatial orientation, in particular is scaleable, wherein its spatial parameters define a spatial extension and a spatial orientation of the template, in particular height, width, azimuthal angle and/or tilt angle. By that, the orientation of a given template can be set according to an orientation of the object to be measured, i.e. for which information should be gathered, in the real world depending on the point of view (the measuring coordinate system, respectively), e.g. depending on the perspective of a surveying instrument to the object.

Moreover, the template can provide object parameters being related to the type of object (to be measured), wherein the object parameters provide information about a no-flight zone and/or, an area of the object of particular interest. By that, the template already provides for object-related data necessary to plan the acquisition of further data of the object with the UAV.

By that, the first measuring path can automatically be generated by considering particular properties of the respective object (object parameters) to be measured, e.g. if the object is a common building, a bridge or a tower, whereby an optimised measuring path can be derived. For providing such object properties, pre-known assumptions of the object may be provided to a processing and controlling unit of the system. The object properties can be provided by a rough digital model or by information concerning the structure of the object type in general.

Concerning referencing of the digitally provided template to the position and orientation of the real object (in the measuring coordinate system), the template can be referenced with the positional data by digitally adapting a scaling and/or a spatial orientation of the template so that size and/orientation of the template correspond to size and/orientation of the object in the measuring coordinate system. Furthermore, template positioning data may be fitted with the positional data (concerning the object), wherein a set of template reference points is fitted with the positional data.

As a result, the template is provided with a position and orientation in the measuring coordinate system corresponding to the position and orientation of the object.

According to some embodiments of the invention, the template is derived based on a digital model for the object and/or based on a measurement of the object, in particular based on the positional data. Thus, the template either may be generated by use of a digital object-model, e.g. a CAD-model of the object or type of object, and/or may be embodied as a specific geometric figure, e.g. plane, cylinder, sphere, or basically in form of the model.

Furthermore, the template can be generated in the field, i.e. during a measuring process, wherein a number of object-related points may be measured, e.g. four corners of a house wall or at least three points on the wall, and a template according to the actual object can be derived, e.g. a plane parallel to the wall. Preferably, an offset as to a distance between the wall and the virtual plane is defined either manually by a user or automatically using pre-defined measuring conditions.

For instance, corner points of a building with basically flat walls—one of which wall particularly facing a used surveying instrument—are measured by aligning the measuring laser beam of the surveying instrument to the facing corner points and gathering distance and angular data for each point. Based on the determined corner points a plane (representing the template) is extracted which is parallel to the facing wall and which has a defined distance to that wall. The position of the plane (i.e. the distance to the wall) may be set according to given measuring parameters of the image capturing unit of the UAV, e.g. according to a focal range or a zooming function of that unit, and the desired ground sampling distance (The closer to the object, the smaller the ground sampling distance, the smaller the field-of-view).

Such plane then can be used as a basis for generating the data acquisition points and/or the first measuring path (i.e. the template is provided in form of the plane). The acquisition points or section and/or the first measuring path can be set so that they lie in the respective plane. By that procedure, a defined measuring distance is given between the UAV and the building all along the measuring path or with respect to each of the data acquisition points.

Now referring to the determination of positional data for the object, such positional data can be determined by measuring positions of a set of object representing points related to the object by use of a position determining device, in particular a surveying instrument or GNSS sensor, in particular total station or mobile phone comprising a GNSS sensor. Such object representing points not necessarily have to be located directly at the object but may comprise a defined positional (and orienting) relation to the object (e.g. a marking on the ground being spaced with defined distance from the object).

Alternatively or additionally, some embodiments may be at least partly coarsely scanned with the position determining device, wherein the position determining device is embodied as a laser scanner. A course point cloud may be provided, which coarsely represents a surface of the object and which provides a basis for either generating an object-specific template or for adapting a known/given template according to the scanned object.

Moreover, a further method for gathering the positional data is given by using geo-referenced digital terrain data (map) and (based thereon) selecting at least one object representing point according to the terrain data. A respective template then is adapted to fit the terrain data properties, e.g. with respect to a scale of the terrain data and/or azimuthal direction (north-direction). For instance, a suitable template for using terrain data may provide to set a height of the template for representing a defined height of a building.

As mentioned above, data acquisition on side of the UAV can be provided by different approaches. Thus, the data acquisition unit can be embodied in different ways. According to the invention, the data acquisition unit can be embodied as a image capturing unit, in particular a camera (e.g. video camera), or as scanning unit, wherein acquisition of the object information is provided by capturing at least one image according to the at least one data acquisition point or section or capturing at least one image sequence, in particular a video, according to the at least one data acquisition section or section or by scanning the object according to the at least one data acquisition section.

Therefore, the UAV provides for capturing images according to specific points or within a wider region, with other words, one image is captured with each data acquisition point or one image or a series of images is captured within a defined segment, wherein starting of the capturing process is triggered at reaching the data acquisition section and ending the capturing process is triggered on reaching the end of the section. Starting and ending a respective scanning process is triggered accordingly. A scanning resolution or an image-capturing-frequency (frames per second, fps) can individually be defined.

Furthermore, a series of data acquisition points (or sections) can be derived based on the referenced template, wherein a series of images is captured by means of the data acquisition unit with respect to the series of data acquisition points. In particular, stereoscopic images can be derived based on (at least) pairs of images, in particular of successive images, providing positional information of measuring points at the object, and/or the first measuring path can comprise the series of data acquisition points (or sections), particularly including the at least one data acquisition point (or section).

Thus, by flying along the measuring path the UAV enables to capture a series of images corresponding to the data acquisition points or within one or more respective sections of the first measuring path. Moreover, the series of images can be processed in order to derive positional data of respective points at the object, i.e. deriving a precise high-resolution representation of the object with respective positional data.

With respect to the processing of the images, that processing can be performed immediately (i.e. during flying along the measuring path), e.g. using a SLAM—(Simultaneous Localisation and Mapping) or Structure-from-Motion (SfM) algorithm, wherein the data of even more than two images may be processed together. Alternatively, such data-processing is done in a post-processing step.

According to some embodiments of the invention, a point cloud is processed based on the images captured according to the series of data acquisition points, the point cloud representing the regions of the object covered by the images. The point cloud may be processed by use of a stereoscopic approach based on the image data provided by the series of images. The point cloud provides position data with respective high point-to-point resolution regarding the object.

Alternatively or additionally, the template may be related to a particular type of object, e.g. high-voltage pole or church tower, and describes an enveloping shape of the object. By knowing the type of object to be measured, selecting a respective template and measuring respective points at the object (such points preferably being defined by the used template) size, position and orientation of the template can be adapted to the real object and thus a (virtual) surface of the object can be derived in the measuring coordinate system. Such template information is then used as for path planning.

Furthermore, according to some embodiments of the invention, the measuring path may be associated to a defined template. Thus, by referencing the template with the real object a corresponding measuring path may automatically be adjusted in one common step. Particular measuring points or points of interest may be defined with the template and the pre-defined measuring sequence as well. Hence, by positioning, rotating and scaling the template, the path is adapted correspondingly (e.g. stretched or compressed) and the UAV can be guided along that path for measuring the object. Such process is also to be understood as a measuring path being derived at least based on the template.

According to a further approach according to the invention, the positional data can be determined by at least partly coarsely scanning the object with a surveying instrument, wherein the surveying instrument may be embodied as a laser scanner or a total station with scanning functionality. With that, spatial object information can directly be derived and be used for defining data acquisition points and/or a measuring path relating to the object. A coarse (and therefore fast) scan of the object provides for surface information with relatively low point-to-point resolution but enables to define the data acquisition points for gathering more precise surface data. In particular, a rough point cloud provided by such rough scan is directly used as respective template or enables for suitable adaptation of a known template.

According to some embodiments of the invention, a surrounding of the object is coarsely scanned and/or captured by means of the surveying instrument, wherein surrounding data is provided and the surrounding data particularly provides information about obstacles (with respect to scanning the object in its entirety). Moreover, the at least one data acquisition point or section is determined depending on the surrounding data, wherein the first measuring path is adapted depending on the surrounding data.

Such procedure enables to identify and consider possible obstacles which the UAV could collide with during a measuring procedure (e.g. during capturing images of the object). A possible first measuring path is designed so that the UAV is guided around the obstacle but still can capture suitable images or scanning data of the object. Respectively, the data acquisitions points are set in correspondence so that the UAV would not collide with the obstacle by approaching one of these points.

In particular, e.g. for capturing images of the whole object with relatively less consumption of time, a second measuring path can be derived based on at least the referenced template. The second measuring path may basically be of identical shape and extension compared to the first measuring path, wherein the course of the second measuring path corresponds to the course of the first measuring path. Additionally, the second measuring path may be offset from the first measuring path in defined manner and may comprise further data acquisition points or sections each of which is assigned to a respective data acquisition point or section of the first measuring path.

By that, a number (two or more) of measuring paths can be defined e.g. in a plane which corresponds to a front wall of a building to be covered by images, and the UAV can be controlled to fly along each of those paths successively.

Alternatively or additionally, according to the invention, a further series of images is captured by the data acquisition unit or with a further data acquisition unit as to the further data acquisition points or section of the second measuring path, wherein the further image capturing unit is carried by a second unmanned aerial vehicle and the second unmanned aerial vehicle is controlled in a manner such that it moves along the second measuring path. Thus, the data acquisition points of the first and the second measuring path can be approached basically simultaneously with two UAVs (with image capturing units) and respective images of parts of the object can be captured. More generally, two UAVs are controlled such that each of which flies along one of the measuring paths and gathers image data of the object.

Using the data according to the first and the second measuring path—in particular—stereoscopic images can be derived based on pairs of images, each pair of images is represented by a first image according to a data acquisition point of the first measuring path and a second image according to the assigned data acquisition point of the second measuring path, wherein a constant stereoscopic baseline for each pair of images is provided. Such stereoscopic image provides for directly deriving positional data referring to the surface of the object.

According to some embodiments, the positional data or data acquisition points or sections can be derived from an overview image, in particular from a full-dome image or stitched image, of the object, wherein the overview image is captured by a camera on side of a surveying instrument. Typically, the image data generated by that is combined by position measurement to measuring points at the object in order to provide data to be referenced to the measuring coordinate system of the surveying instrument.

According to some embodiments, the unmanned aerial vehicle is controlled based on image processing of image data provided by an actual image of the unit and an overview image of the object, wherein homologous features in the overview image and the actual image are derived. A spatial position of the UAV relative to the object thus can be determined based on identification and locating of the homologous features in the actual image. Of course, such navigation can be performed by using a section of such overview image or using a captured image with a smaller field of view.

In particular, for such image-based navigation of the UAV according to the invention, the data acquisition unit provides real time image data, in particular a live stream, and controlling of the unmanned aerial vehicle is based on the real time image data (used instead of the actual image).

According to some embodiments, an optical marking can be generated at the object, in particular by directing a laser beam at the object, wherein the unmanned aerial vehicle can be controlled such that it approaches a defined spatial relation to the optical marking based on capturing an image with the data acquisition unit which covers the optical marking and based on deriving a position of the optical marking in the captured image, wherein the optical marking provides a basis for deriving the data acquisition point or section. The optical marking allows to manually and individually directing the UAV in defined spatial position relative to a designated point at the object, wherein controlling of the UAV still is provided in automated manner.

According to some embodiments, the field of view of the image capturing unit of the UAV can be enlarged in order to identify the optical marking at the object over a wider range.

According to some embodiments, a first marking image is captured with the data acquisition unit, which covers the optical marking and a surrounding of the optical marking (at the object).

According to some embodiments, a second marking image is captured which covers the optical marking and a surrounding of the optical marking, wherein a spatial position of the point at the object, which is marked by the optical marking, is determined based on the first and the second marking image, e.g. by applying a stereoscopic processing algorithm for extracting positional information based on both images. It is to be understood that such information may not only be determined for the marked point but also for the surface of the object in the surrounding of the marked point.

Concerning the controlled movement of the UAV, according to a particular embodiment of the invention, the unmanned aerial vehicle (UAV) is continuously tracked by locking a laser beam emitted from a surveying instrument to the UAV and thereby continuously providing the actual position of the UAV. The UAV preferably comprises a retro-reflector in order to provide back reflecting the laser beam and thus to provide precise position determination.

Some embodiments also relate to a geodetic surveying system for providing information about an object. The geodetic surveying system comprises a data receiving unit adapted to receive and provide positional data with reference to the object, the positional data being referenced to a measuring coordinate system.

The system additionally comprises a data acquisition unit for acquiring object information, and a controlling and processing unit adapted to derive the at least one data acquisition point or section and to control acquisition of data as to the at least one data acquisition point or section.

According to some embodiments, the system also comprises an unmanned aerial vehicle (UAV) which comprises the data acquisition unit. Moreover, the system comprises a database providing a digital template regarding the object, the template at least partly representing the object in coarse manner, in particular a shape and/or rough topography of the object. The controlling and processing unit is adapted to control a movement of the UAV.

Furthermore, the controlling and processing unit is adapted to execute a data acquisition functionality, the data acquisition functionality being at least defined by referencing the template with the positional data so that the template corresponds as to its spatial parameters to the object in the measuring coordinate system, deriving a spatial position of at least one data acquisition point or section related to the object based on at least the positional data and/or the template, controlling the unmanned aerial vehicle in a manner such that it approaches the at least one data acquisition point or section, and acquiring object information as to at least a part of the object according to the at least one data acquisition point or section by triggering the data acquisition unit depending on fulfilling a defined distance criterion, the distance criterion defining a spatial relation between an actual position of the unmanned aerial vehicle and the at least one data acquisition point or section.

Preferably, one or more steps of the measuring functionality are executed in automated manner.

According to some embodiments of the geodetic surveying system according to the invention, the system, in particular the controlling and processing unit, is designed in a manner such that a method as outlined above is executable.

For determining position and/or orientation of the UAV, the unmanned aerial vehicle particularly can comprise an inertial measuring unit, in particular an accelerometer, tilt sensor, magnetic compass and/or gyroscope. Alternatively or additionally, the UAV may comprise a retro-reflecting unit (prism, retro-reflecting foil etc.) for providing position determination by receiving and back-reflecting a measuring beam emitted from the surveying instrument.

The knowledge about the full spatial orientation of the UAV in the coordinate system of the surveying instrument can be gained in different ways. The surveying instrument can measure the orientation of the UAV directly using e.g. its own camera and special markers on the UAV. Additionally, the UAV can measure its own spatial orientation using a combination of GNSS, IMU and imaging sensors.

Some embodiments of the invention relate to a computer program product having computer-executable instructions for controlling and executing at least the steps of receiving the positional data and the template regarding the object, referencing the template with the positional data,
deriving a spatial position of at least one data acquisition point or section,
controlling the unmanned aerial vehicle and
acquiring object information as to at least a part of the object according to the method described above, in particular based on continuously receiving an actual position of the unmanned aerial vehicle and/or receiving a referenced spatial position of the unmanned aerial vehicle, in particular when the computer program product being run on a controlling and processing unit of a geodetic surveying system as described before.

BRIEF DESCRIPTION OF THE FIGURES

The method and the devices according to the invention are described or explained in more detail below, purely by way of example, with reference to working examples shown schematically in the drawings. Specifically.

FIGS. 5a-c show an embodiment of the present invention which relates to acquiring reference data of more complex objects (dam);

FIGS. 13a-c show a template-based acquirement of information for an object by use of a geo-referenced map and a template for the object of interest according to the invention.

DETAILED DESCRIPTION

Figure 1A:
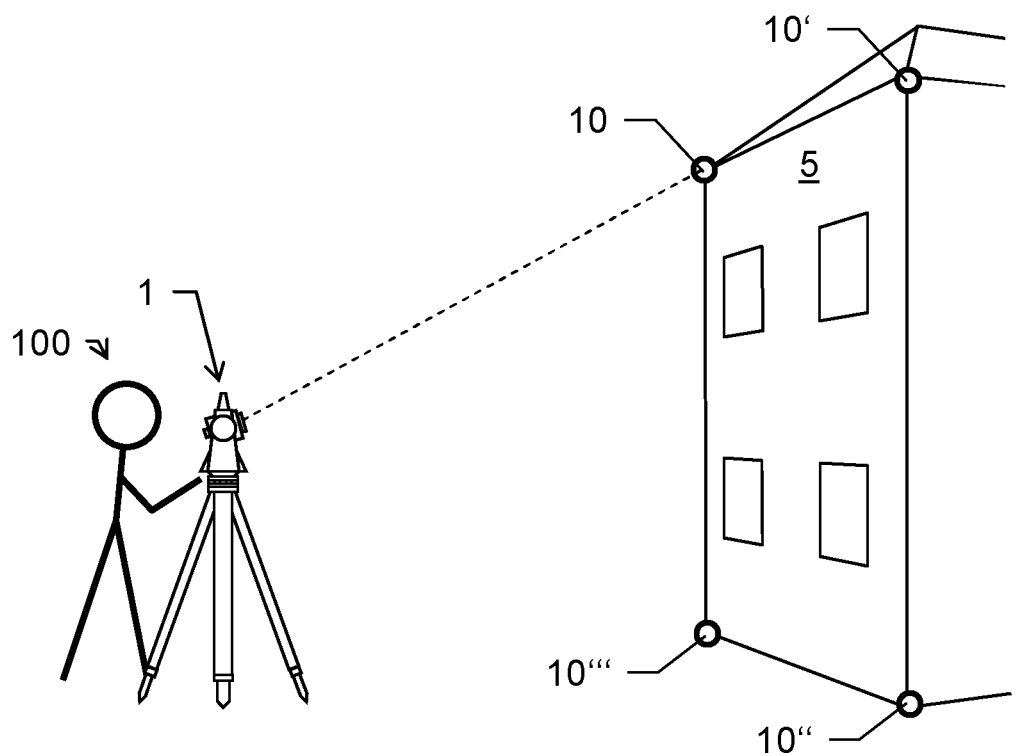
FIGS. 1a-b show an embodiment according to the invention, wherein reference data regarding an object is derived based on measurements with a surveying instrument.
Figure 1B:
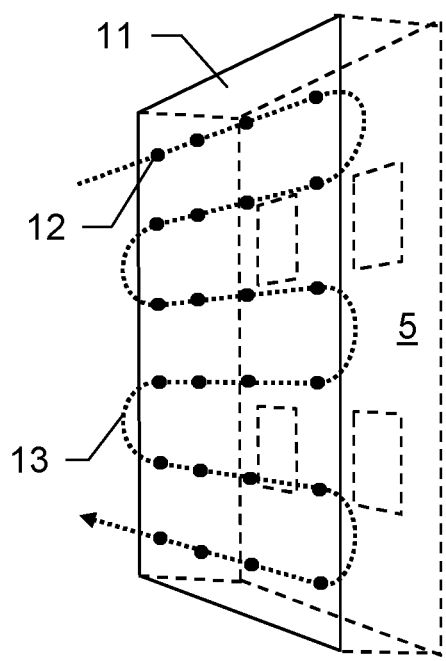

FIGS. 1a and 1b show the main idea of the invention in general, such is to derive positional data as to an object 5 to be measured, e.g. reference points 10-10''' or a plane, for instance based on measurements from a surveying instrument 1 as shown, e.g. by a total station or a terrestrial laser scanner. This positional data is then used to define the flight path for an unmanned aerial vehicle (UAV).

As can be seen from FIG. 1a, an operator 100 of the surveying system measures four reference points 10-10''' at a façade of a building 5, the reference points 10-10''' represent the corners of the facing surface of the building 5. The total station 1 enables to determine precise geo-referenced coordinates of the reference points 10-10''' (in a measuring coordinate system defined by the total station 1 and/or in an absolute global coordinate system if the total station 1 is already referenced to that).

By use of the information, that the object 5 to be measured by the UAV belongs to a pre-defined type of typical building, a plane 11 (actually a planar, rectangular area) corresponding to the surface of the façade of the building 5 (here: parallel to the surface of the building) and having defined distance to the façade, e.g. 2 m, is automatically derived as a template by application of a respective algorithm. Such derived plane 11 represents a kind of virtual envelope (template) for the object 5, wherein the coordinates of the plane 11 are already known in the measuring coordinate system (of the surveying instrument) and/or in the absolute coordinate system. Based on that information respective data acquisition points 12 (only one of these points is referenced in FIG. 1b for providing better overview) are defined with respect to the position of the plane 5, particularly in the plane 5 as shown.

Alternatively, the template plane 11 can be selected by a user from the GUI. The user may then be instructed to measure the corner points of the façade, wherein the plane-equation and the boundaries of the rectangular area are derived by application of a specific algorithm. Alternatively, the template can be selected automatically by an algorithm as explained with FIG. 5a.

Moreover, a corresponding measuring path 13 is derived based on the template (i.e. here: on the position, size and shape of the plane 5). Such measuring path 13 provides a flying route for the UAV, wherein an image of at least a part of the object 5 can be captured at each acquisition point 12. Since the corner points are measured in the coordinate frame of the total station 1 also the resulting path 13 refers to this coordinate system.

The data acquisition points 12 along the measuring path 13 and the optical properties of the image capturing unit on side of the UAV are geared to each other so and are set so that the regions of the object 5 which are covered by respectively captured images are overlapping in defined manner. Thus, image data acquisition of the entire object can be provided.

In addition to deriving the template (the plane 11) for the object to be measured, the unmanned aerial vehicle is referenced in the measuring coordinate system which is defined by the surveying instrument 1. For that, e.g. the position of the UAV is measured with the surveying instrument 1 and further controlling of the UAV is based on that initial position data, wherein the UAV comprises a kind of IMU (inertial measuring unit) which enables to continuously derive changes in position and orientation of the UAV. Such IMU for instance may comprise acceleration sensors, a magnetic compass, tilt sensors and/or a gyro.

Alternatively or additionally, the UAV is tracked by the surveying instrument 1 such that a laser beam from the surveying instrument 1 is locked-on the UAV and UAV's position is derived continuously. In particular, in case of using an absolute global coordinate system also a GNSS sensor onboard of the UAV can be used for controlling the movement.

As a result of referencing the UAV in the measuring coordinate system the data acquired by the UAV is directly referenced to that system or—if the surveying device is referenced regarding its position and orientation to an absolute global coordinate system—even to this absolute global coordinate system, as well. A post-processing of the acquired data as to that aspect is not necessary. Thus, by using the total station 1 to control the UAV no transformation has to be applied between the nominal position of the plan and the measured position.

According to surveying of alternative objects, the reference surface (template) can have a more general shape, e.g. cylindrical etc.

Figure 2:
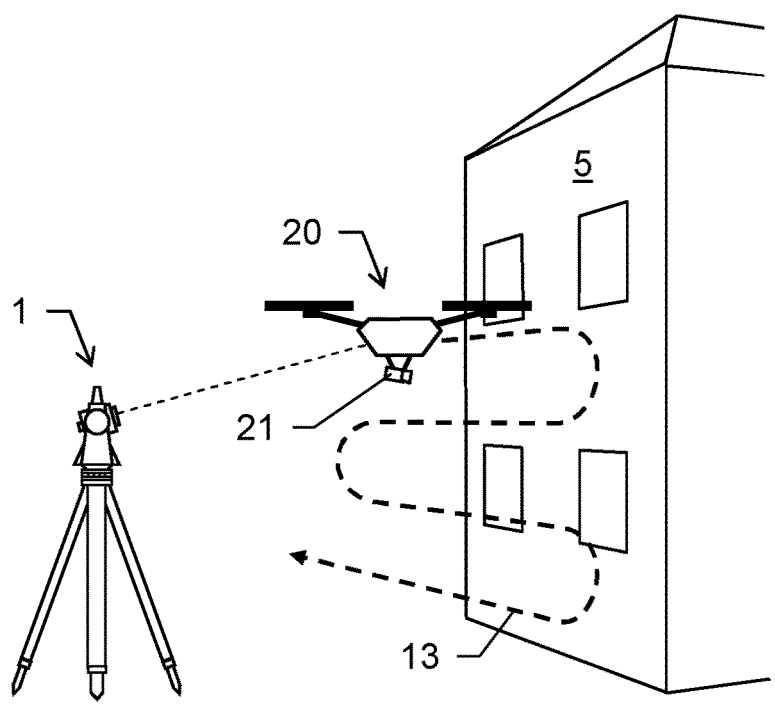
FIG. 2 shows an further embodiment according to the invention, wherein an unmanned aerial vehicle (UAV) is controlled by a surveying device according to a measuring path, the UAV comprising an image capturing unit.

FIG. 2 shows an unmanned aerial vehicle 20 (UAV) which is controlled by a surveying device 1. The UAV 20 comprises a data acquisition unit 21, e.g. a camera, for capturing images of the object 5. A measuring path 13 is defined based on the surface information regarding the object 5, wherein such information was determined by measuring respective points of interest at the object 5 with the surveying device 1.

The UAV is guided along the measuring path 13 in order to capture a series of images, wherein the facing wall (facing the surveying device 1) is to be covered entirely by the sum of the captured images. Depending at least on the field of view of the image capturing unit 21 and on the distance between the UAV 20 and the building 5 and the required overlap a respective number of image acquisition points is defined along the path 13 and at least one image is captured at each of such points.

The laser beam emitted from the surveying device 1 remains directed at the UAV 20 so that the position of the UAV 20 can be determined in defined time intervals, preferably continuously. For that, the UAV 20 particularly comprises a retro-reflector for back-reflecting the impinging laser light and providing precise distance measurement to the UAV 20.

Figure 3:
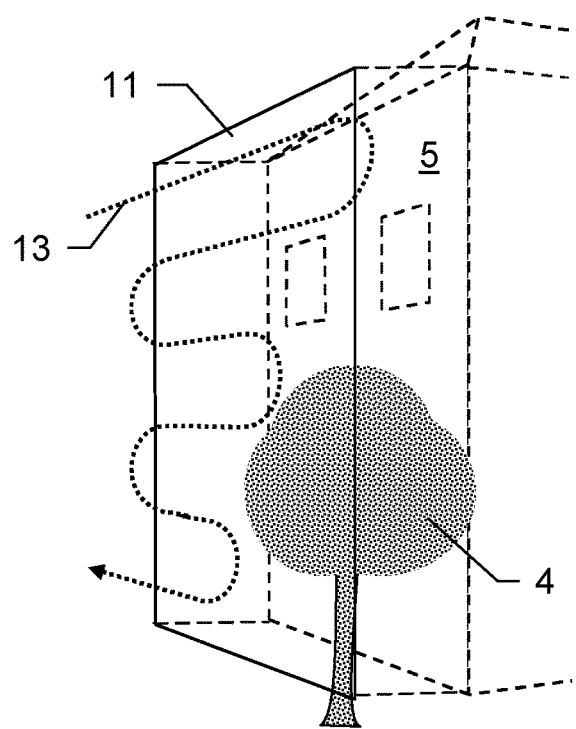
FIG. 3 shows a further aspect of the method according to the invention, wherein an obstacle is recognised and considered in way of path planning and data acquisition.

FIG. 3 shows a further aspect of the measuring method according to the invention, wherein an obstacle 4, e.g. a tree, is recognised and considered in way of path planning and data acquisition. Therefore, the positional data gathered by a surveying instrument may be generated by capturing an overview image of the object 5 or by roughly scanning the object (e.g. in case the surveying instrument is embodied as a laser scanner), wherein based on object positional data derived thereby the obstacle 4 can be identified, e.g. by image processing (feature extraction) or processing of a respective point cloud.

Once the obstacle 4 is recognised, the measuring path 13 for guiding the UAV is derived or adapted accordingly. The path 13 may be set so that a minimum distance between the UAV and the obstacle is guaranteed, wherein a pre-defined measuring distance to the object 5 is provided.

In that context and concerning general aspects of the present invention, energy optimisation should be considered with flight planning, i.e. flying longer distances in a sidewards movement than in up- and downwards directions. Also the line-of-sight between to UAV and the surveying instrument should be considered in the path planning. If there are obstacles 4 and the line-of-sight is interrupted the UAV can be enabled to navigate without continuous position information from the surveying instrument, i.e. based on other sensors like IMU, GNSS-signals or camera only. However, if no absolute position measurement is available over a longer time period, the position estimate might degrade (e.g. as measurements with the on-board sensors IMU and camera are drifting over time). Therefore, the UAV can be locked-on to the surveying instrument again from time to time for updating position and/or orientation values. Areas where no line-of-sight is available can be derived from measurements with the surveying instrument and be considered in the path planning.

Furthermore, an existing geo-referenced CAD model (e.g. derived from Building Information Modelling (BIM) system) of the object 5 of interest could be used in addition to measurements with the surveying instrument for flight planning.

Figure 4:
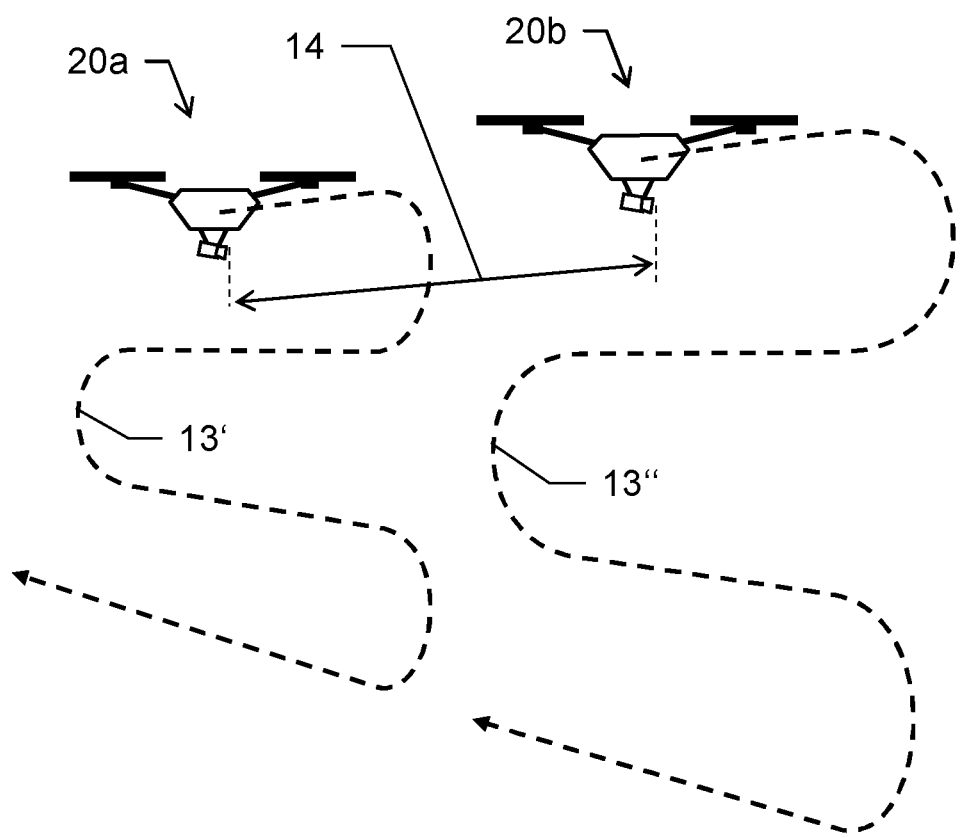
FIG. 4 relates to a further embodiment of the invention, wherein a tandem flight of two UAVs is shown.

FIG. 4 relates to a further embodiment according to the invention. Here a tandem flight of two UAVs 20a,20b is shown. For such tandem flight two corresponding measuring paths 13',13" are determined based on data template which is related to the object to be measured.

Particularly, the paths 13' and 13" are of basically identical shape but offset relative to each other by a defined distance and direction. Thus, by performing tandem flight with two (or more) UAVs 20a,20b according to the paths 13',13" (or more) and capturing images correspondingly, in particular simultaneously, a basically constant baseline 14 is given. In that way, pairs of simultaneously captured images could be used for directly deriving distance information from the images on basis of a stereo-photogrammetric approach. The distance information is directly given in the measuring coordinate system of a respective surveying instrument.

Alternatively, on single UAV is initially controlled to fly along the first path 13' and afterwards along the second path 13", wherein data acquisition points along the paths 13',13" correspond to each other and processing of pairs of images (or more) is performed when flying along the second path 13" by additionally using the images captured along the first path 13'.

Figure 5B:
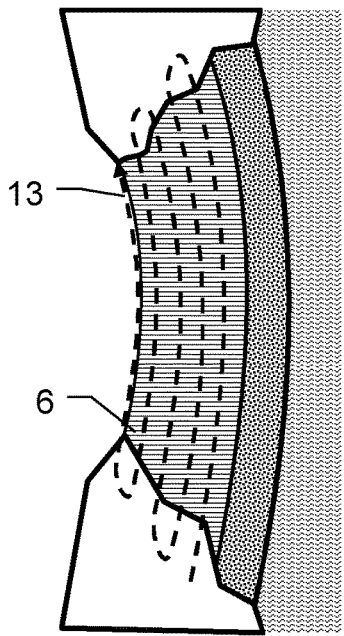
Figure 5C:
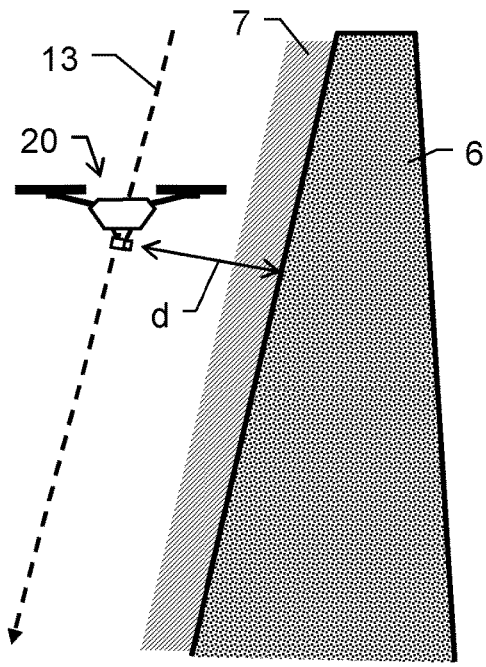

FIGS. 5a to 5c show an embodiment of the present invention which relates to acquiring data of more complex objects, i.e. with respect to their structural properties (shape). A more complex object does not have a planar or homogenously formed surface.

FIG. 5a shows an operator 100 using a surveying instrument 1 in order to gather positional data of a dam 6 in top-view perspective. For that, a rough scan (e.g. a point-to-point distance of 1 m) of the dam 6 is performed with the surveying instrument 1 in order to derive respective positional data.

On the basis of the scanning data a surface of the dam 6, e.g. a curved, a conical or a cylindrical surface, is extracted which roughly represents the shape of the dam 6. A corresponding template is then derived and referenced to the positional data, e.g. a parallel surface with a defined distance d from the object 6, and is used for the path planning, wherein the extracted surface provides the basis for selecting and adapting the template. Moreover, according to the properties of the UAV 20, e.g. the dimensions and/or placement of the rotors, a no-flight-zone 7 can be defined to avoid collisions of the UAV 20 with the dam 6 (FIGS. 5b-c). Such no-flight-zone 7 may already be provided by the selected template.

Considering the desired overlap of the covered regions of the dam 6 by taking respective images, the flight path is then designed into the template. This enables constant distance between the camera and the surface of the dam 6 and, as consequence, a constant resolution of a measurement sensor, e.g. the camera, onboard the UAV 20.

Figure 6A:
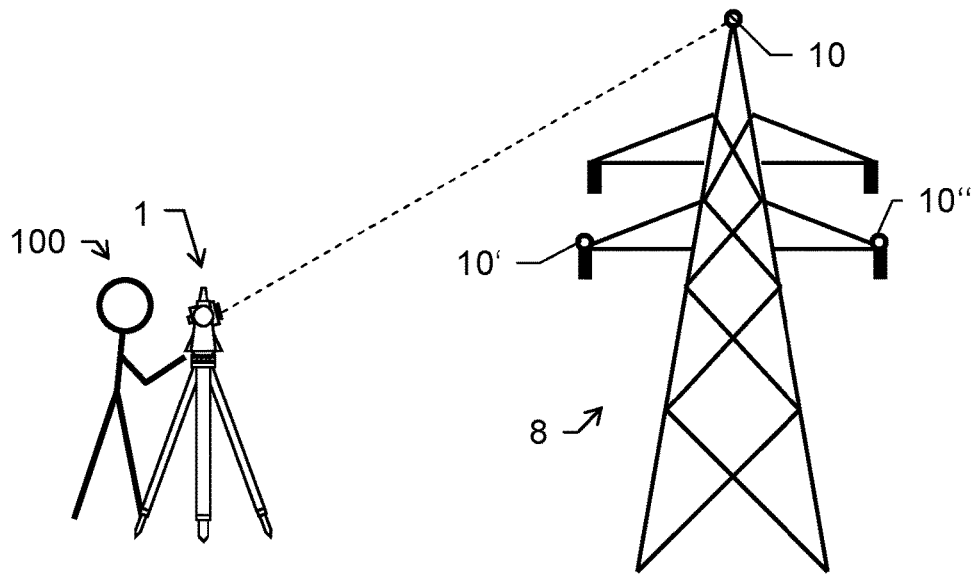
FIGS. 6a-b show a further embodiment according to the invention using a template for flight planning and for capturing images with an UAV.
Figure 6B:
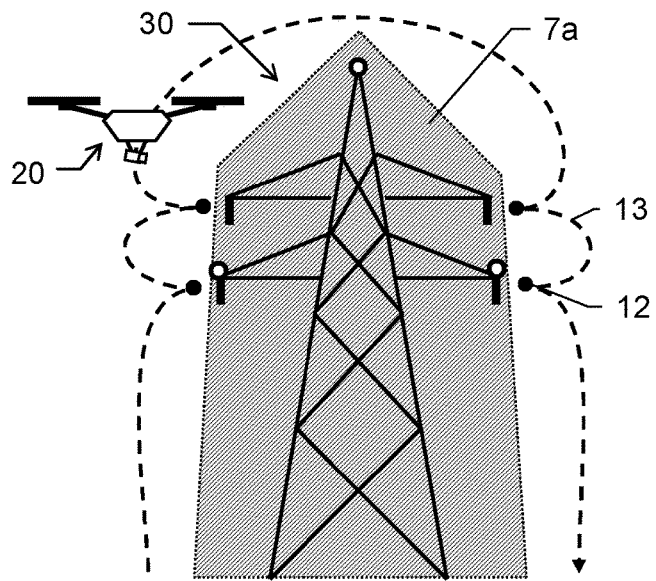

FIGS. 6a and 6b show a further embodiment of flight planning for capturing images with an UAV 20 by use of a total station 1 according to the invention.

In the field, the user 100 measures the coordinates of reference points 10-10" (=positional data) with the surveying instrument 1. Based on these coordinates and/or an image of the object 8 a given template 30, which represents a measuring concept for the object 8 to be measured, is geo-referenced, i.e. all coordinates of the template 30 are transformed onto the real object 8 and refer to the coordinate system of the surveying instrument 1.

The path planning then is performed on the basis of the selected and referenced template 30. The selection of a suitable template 30 may be performed automatically, e.g. using a particular algorithm, in particular by image processing of an image which covers the object 8, extracting features in the image and comparing the extracted features with data of a template-database, or is done manually by the operator 100.

For each type of objects of interest, e.g. a power pole 8 as shown here, a respective template 30, which provides an optimal flight path 13, positions for image acquisition 12 and/or no-flight-zones 7a for the respective object 8, is generated in advance of the measuring process and provided for flight planning. The template 30 preferably also contains three or more reference points which can easily be identified at the real object 8 and which provide for transformation of the template 30 (in particular regarding the size of the template 30) according to the real object 8.

In other words, the user 100 at least measures reference points 10-10" at an object 8 to be measured, wherein the type of object is identified based on the relative positions of theses points 10-10" and/or an respective image of the object and a template 30 which e.g. is associated to the positional distribution of the points 10-10" (or based on image-processing) is selected automatically and fit to the object size and orientation (relative to the surveying instrument 1). On basis of the template 30 a respective measuring path 13 is derived and the UAV 20 is guided along the measuring path 13. By reaching a defined distance to an image acquisition point 12, particularly by reaching the point 12 itself, an image of at least a part of the object 8 is captured respectively.

Based on a set of at least three corresponding points given in the coordinate system of the template and measured with the surveying system in the measurement coordinate system the parameters of a similarity transformation can be derived, i.e. three translations, three rotations, one scale. Based on these parameters all coordinates of the template, e.g. image acquisition points, measuring path, etc. can be transformed from the template to the real world.

Alternatively or additionally, an image of at least a part of the object 8 is captured on side of the total station 1 and the type of object is identified based on the captured image, in particular by image processing.

Furthermore, the template 30 referring to the object 8 may be chosen manually by the user 100, wherein the dimensional and directional transformation of the template either is performed manually as well or is calculated automatically using the measured reference points 10-10".

In general, controlling of the UAV 20 may be provided on side of the surveying instrument 1, wherein controlling signals are transmitted to the UAV 20 wirelessly. Alternatively, the UAV 20 comprises a controlling and processing unit which provides for controlling the UAV 20 onboard. For that, data referencing an actual position of the UAV 20 is provided to the UAV 20 from the surveying instrument 1.

In that context, the UAV 20 can be locked to the surveying instrument 1 by keeping the laser beam directed at the UAV 20. The surveying instrument 1 is then used to control the UAV 20 and to keep it on track 13.

Moreover, a given CAD-model (e.g. from Building Information Modelling (BIM) system) of an object 30 of interest could be used as at template 30 (preferably in adapted manner) and for deriving the measuring path 13.

As a further aspect, the positional data and the coordinates of the referenced template may be referenced (transformed) to a global coordinate system, e.g. WGS84, and controlling of the UAV is carried out by use off a GNSS sensor integrated in the UAV.

This is of particular interest with view to inspection of, e.g. a power pole 8, in regular time intervals. Then only one time the positional data is to be derived (e.g. only one time a surveying instrument is needed to be set up for generation of the measurement data). As the coordinates to the power pole 8 are known in the global system, the surveying instrument is not needed for further inspection flights anymore. The UAV may be controlled on bases of the initially generated object data.

Figure 7A:
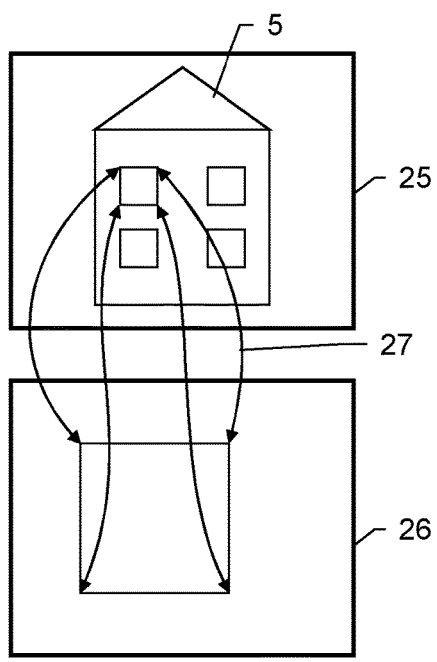
FIGS. 7a-b show a further embodiment of the present invention which relates to image-based navigation of the UAV.
Figure 7B:
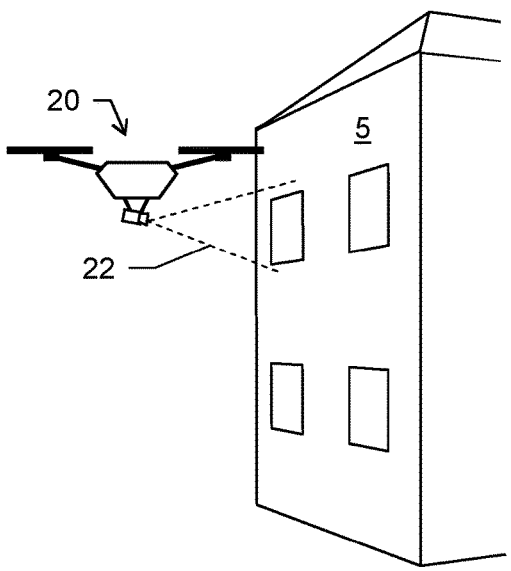

FIGS. 7a and 7b show a further embodiment of the present invention which relates to image-based navigation of the UAV.

For that, an image 25, e.g. a panorama image or a mosaic image, of the object 5 is generated with a surveying instrument. The image 5 can be shown on the display of the surveying instrument or a controller or a notebook, wherein the user particularly can select a region of interest of the object 5. The region of interest is analysed on side of the surveying instrument for significant structures and takes automatically the measurements necessary for the definition of the template, e.g. a plane corresponding to the front wall of the building 5. Based on the template the image acquisition points can be derived and the path planning can be performed as described above.

Alternatively, the template is directly derived based on the captured image 5, wherein e.g. a small number of points are measured at the object 5 for providing respective position information relating to the object 5. Furthermore, according to another embodiment, a region of interest does not have to be selected and the image is analysed in its entirety.

Moreover, an image-based control of the UAV 20 can be implemented. Based on homologous features 27 detected in the image 26 captured in real-time by the UAV 20 on the one hand and the image 25 taken at the beginning with the surveying instrument the actual pose of the UAV 20 can be determined. Image 26 covers a region at the object 5 according to the field of view 22 of the camera and the distance between the object 5 and the UAV 20.

Such image-based control is not restricted to be used only with image-based determination of the reference data but may be applied also when positional data is gathered by directly measuring reference points at the object or any other method explained herein above or below.

Figure 8A:
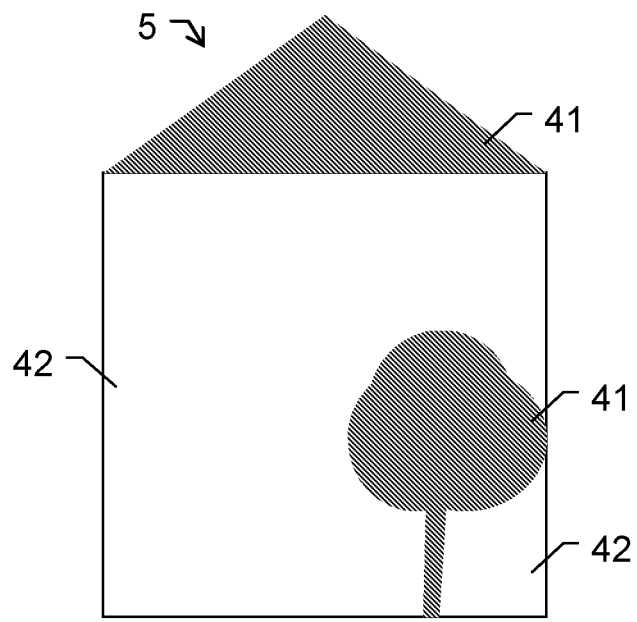
FIGS. 8a-b illustrate an inventive method of measuring an object by acquiring object data with a combination of different data acquisition systems.
Figure 8B:
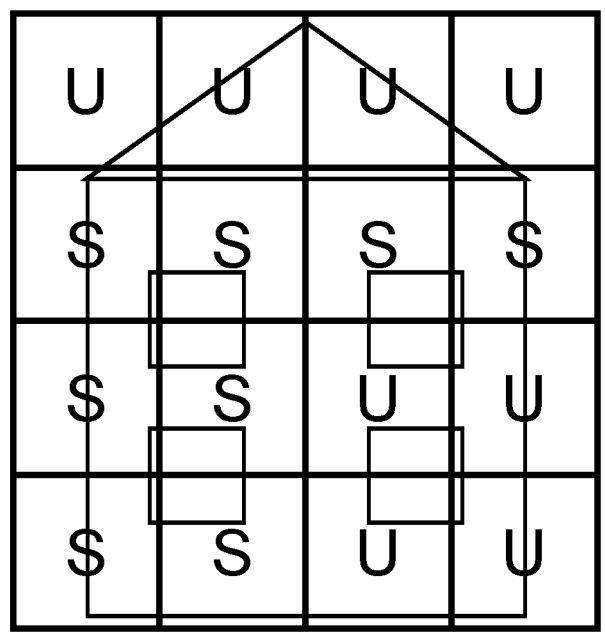

FIGS. 8a and 8b illustrate a method of measuring an object 5 by acquiring object data with a combination of different data acquisition systems.

This aspect aims for a combined surveying with several systems, e.g. a total station, a laser scanner and/or an UAV, where each of these has its strengths and weaknesses. A laser scanner can measure millions of points with high accuracy. An UAV for instance can fly high above and take images from the top of a building. Moreover, an UAV is mobile and therefore flexible to circumvent obstacles, e.g. trees.

Based on information captured with the surveying instrument (total station or laser scanner), e.g. image data or a rough point cloud of the area of interest is segmented in several parts. Each part is assigned to a system, e.g. laser scanner and UAV, according to its strengths. In FIG. 8a the object 5 (see FIG. 3) is shown with a first group of areas 41 that are assigned to be surveyed with the UAV and a second group 42 assigned to be scanned by the laser scanner.

Alternatively, as can be seen from FIG. 8b, the object 5 can be segmented into cells and these cells are assigned to a respective system. Here, the cells marked with "U" are assigned to be imaged by an UAV and the cells marked with "S" are assigned to be scanned by a laser scanner. By combining these precise object data, an entire model of the object 5 may be derived.

Figure 9:
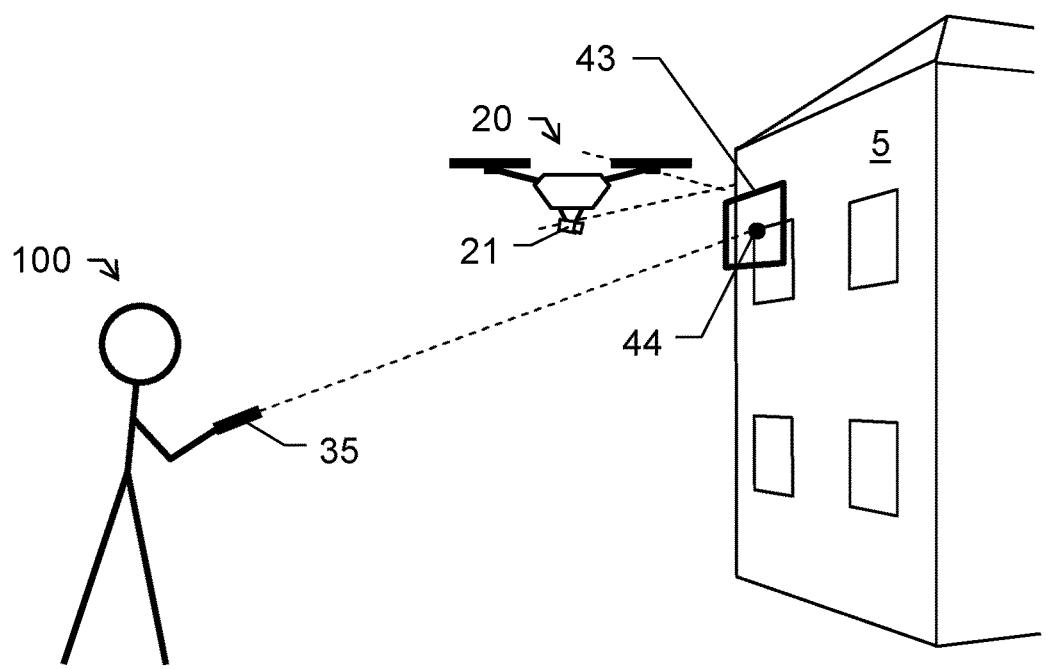
FIG. 9 relates to a specific embodiment of the present invention, wherein a region or point of interest is marked at the object and the UAV is automatically controlled so that an image can be captured which covers that region with the image capturing unit.

FIG. 9 relates to a specific embodiment of the present invention, wherein a region of interest 43 is marked at the object 5 to be measured and the UAV 20 is automatically controlled so that an image can be captured which covers that region with the image capturing unit 21. Controlling of the UAV 20 is provided based on already derived reference data, data acquisition points and/or a flight plan.

An operator 100 marks a point 44 at the object 5 with a marker. The marking point 44 may be provided by emitting a laser beam from a hand-held device, e.g. Disto or laser pointer, to the object 5. The point 44 defines the centre of an area 43 of interest to be captured and thus may be handled as a data acquisition point of above. The laser spot 44 on the object 5 is recorded by the camera unit 21 of the UAV 20. The UAV 20 is controlled to take then automatically a position where the field-of-view (FOV) of the image capturing unit 21 is centred on the spot and an image is captured according to the desired area 43.

For recognising the point 44 at the object 5 the zoom of the camera unit 21 may be reduced in order to increase the field-of-view and/or the distance to the object 5 may be increased so that a larger area is covered by an actual camera image.

Alternatively, the laser spot 44 can be used to identify points of special interest in the field. From the position of the laser spot 44 in at least two images (which were captured with different poses of the camera unit 21), the spatial coordinates of the marked spots 44 can be automatically calculated (based on stereo-photogrammetry). This allows the surveyor 100 to mark interesting points 44 for which he wants the spatial coordinates in the field, which might be more intuitive, more accurate and/or quicker than selecting some special points during post-processing.

The marking can also be carried out by the surveying instrument.

Figure 10A:
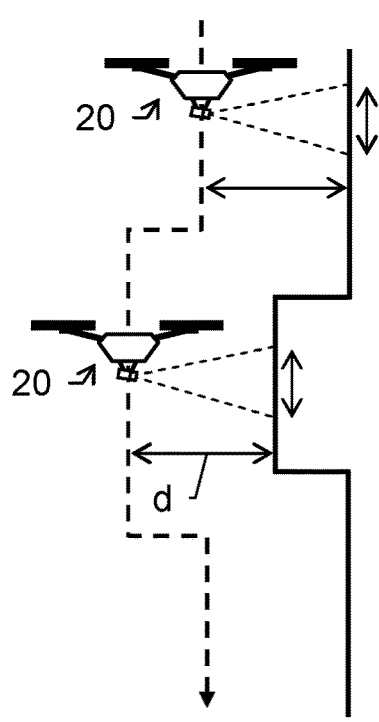
FIGS. 10a-b show a further aspect of the present invention which relates to get constant resolution with the series of images captured of the object.
Figure 10B:
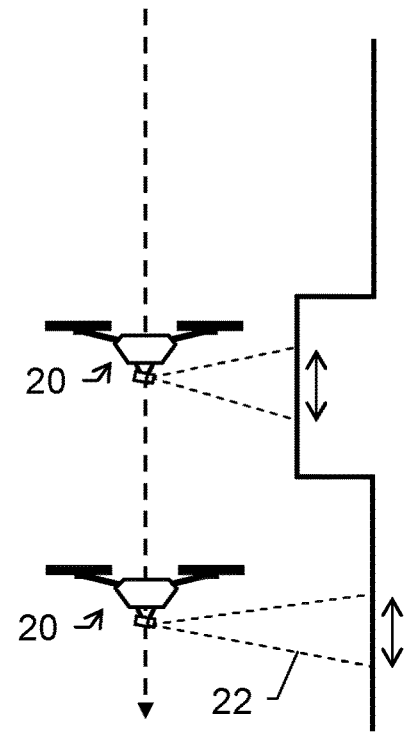

FIGS. 10a and 10b show another aspect of the present invention which relates to get constant resolution with the series of images captured of the object. As can be seen from FIG. 10a, keeping the distance d to the object constant in order to get a constant resolution might be difficult in some cases, i.e. for instance if the object to be measured is of inhomogeneous shape and comprises big topographic variations on its surface. Of course, if the object's surface is quite flat, such approach (flying with constant distance) is very suitable for capturing the object.

Alternatively (FIG. 10b), the flight path can be designed simple, e.g. as a straight line, and the resolution is kept constant by changing the FOV 22 (zoom factor) of the camera. Thus, the measuring path basically is set independently from the topography of the object.

Now referring to a further aspect of the invention (not shown), GIS data can also be used for navigating the UAV.

Having a rough plan for a part of a city for instance, with some building borders and heights defined with a limited accuracy, this information can be used to compute an UAV track (measuring path) also around the buildings. The side of a building may be measured while flying along the track, wherein the measurements are directly related to the GIS map. The UAV can then use the (updated) GIS map to navigate and avoid obstacles, e.g. with a later measuring process.

Additionally, avoiding obstacles that are not referenced in the GIS maps can be done by checking the area around the building before ordering an UAV to fly there. For that, a cheap version of a profiler scanner (attached at the UAV) can be used to provide low resolution range information around the UAV or a sensor utilizing a real-time stereo algorithm (e.g. SLAM) could also be used.

Regarding another embodiment of the invention, acceleration of the measuring process may be realised by taking a panorama of a façade (e.g. of a building) by a total station (TPS) and an algorithm is provided for detecting repeating structures at the façade. Then, the UAV will not have to be directed over all repeating structures, but it would be sufficient to fly over one representative area and to skip the rest of the repeating structures. This would save measuring time and energy. Another possibility would be to fly faster (and collect fewer images) over the repeating areas, and then combine the images from different "instances" of a repeated area to reconstruct the whole façade.

According to another aspect of the invention, glass detection is applied with the measuring method. Windows are often made from glass what makes the 3D reconstruction of an object to be measured much more difficult. An UAV could analyze the changes in consequent images to detect areas, where high reflectance is present (the colour and/or brightness information is changing rapidly with movement), wherein that information is considered for creating a model of the object. Another method can utilize a laser-based distance meter on side of the UAV, wherein glass can be detected by analyzing its response signal. This would allow avoiding wrong reconstruction of glass, and allows filling the missing glass data in a post-processing step.

Moreover, a TPS can be used to automatically track a set of features of a moving object and compute its orientation changes. This data can be further processed for controlling the UAV, wherein the course of the UAV can be adjusted and thus changes in objects' position are reflected to the UAV movement. The tracking can be based on a video stream from the TPS, which may provide a real-time feature tracking and SfM/Kalman filter. Alternatively, a TPS that is able to track multiple targets mounted on an object can be used.

Figure 11:
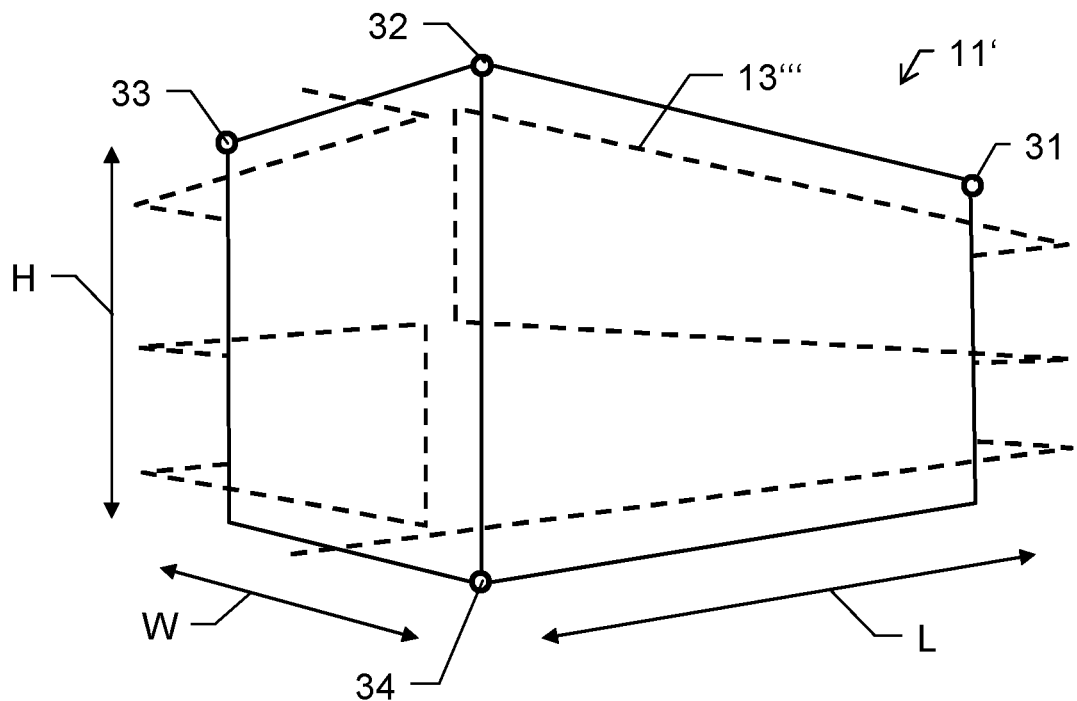
FIG. 11 shows a parameterised template according to the invention.

FIG. 11 shows a parameterised template 11' according to the invention. Such template 11' describes the general shape of the object of interest, e.g. a box-shaped building like a house.

Length L, width W, and height H are used as suitable parameters of the shown template in order to provide scaling of the template according to the dimensions of the real object.

Thus, the scaling parameters length L, width W, and height H are determined based on measurements of positional data with respect to the object. Here, the reference points 31-34 which are assigned to the template 11' are correspondingly measured at the object. I.e. respective coordinates of the corners of a building provide for fitting the template to the object by fitting template reference points 31-34 to the measured coordinates of objects' corner points.

The template 11' is aligned with the real object in the field regarding the position, orientation and parameters L, W, H.

For instance, the template 11' or other templates can represent buildings with different roof types, e.g. gable, hip, shed, etc. According to the number of parameters more or less reference points have to be measured respectively.

The positional data of the object may be determined by placing a GNSS-sensor (GPS-sensor) at each corner of interest and deriving its position. Alternatively or additionally, a surveying instrument is used for deriving the coordinates.

A measuring path 13''' for a respective type of object the template 11' relates to is already pre-defined and assigned to the template 11'. By that, the measuring path 13''' is automatically adapted with scaling the template 11' and thus automatically provides for suitable measuring and flying conditions for an UAV.

Figure 12:
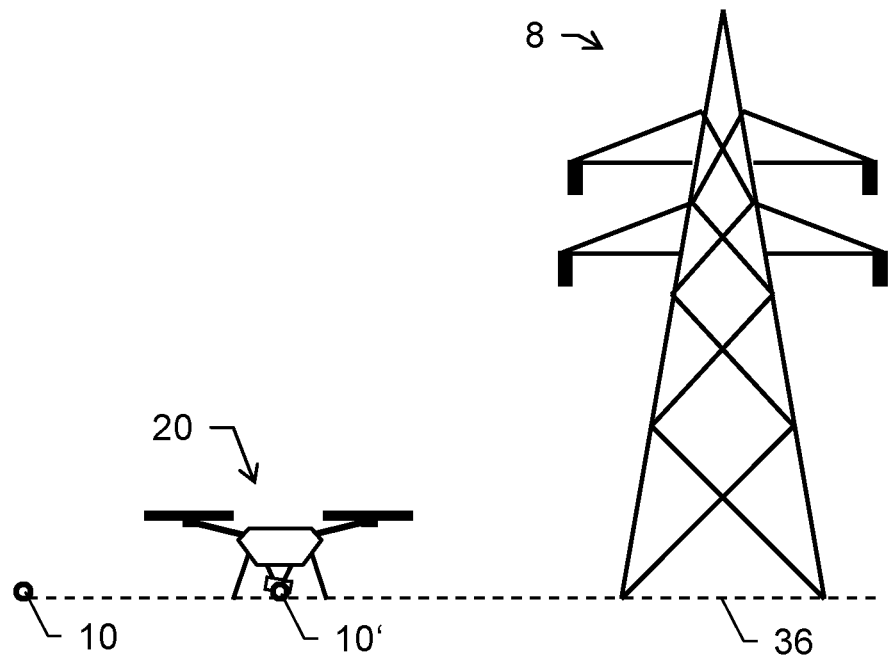
FIG. 12 shows a workflow for template-based path planning based on measurements with GNSS.

FIG. 12 shows a workflow for template-based path planning based on measurements with GNSS—e.g. could be a low-cost GNSS-sensor—on the ground. The reference points 10,10' assigned to a respective template for the object 8 are allocated on the ground.

As shown here, a GNSS-sensor onboard of the UAV 20 is used for measuring the positions of the reference points 10,10'. The UAV 20 is positioned onto the reference points 10,10' and a GNSS-measurement is performed, i.e. coordinates for the points 10,10' are derived.

The UAV 20 may be placed on a first reference point 10 and then on a second reference point 10'. Based on the difference of their coordinates a reference direction 36 for alignment of the template can be derived quite accurately. Roll and pitch can be measured with the IMU of the UAV 20.

Alternatively, the UAV 20 is placed directly on one of the reference points 10,10' with known orientation of the UAV 20, e.g. oriented towards the centre of the object 8. Alignment (referencing) of the template then is performed with knowledge of an orientation of the UAV relative to the object 8.

The measurement of one or more reference points 10,10' can be seen as a kind of differential GPS. Although, if the position measurement is affected by a systematic error, e.g. by 2 m in absolute scale, this has no influence on a relative scale with respect to the object 8 as long as the systematic error does not change significantly until the flight is finished.

The GNSS-sensor could also be integrated into a smartphone which is used for the measurement of at least two or three reference points 10,10' on or close to the ground.

FIGS. 13*a*-*c* show a template-based acquirement of information for an object 5 by use of a geo-referenced map 60 (or ortho-photo) and a template 50 for the object of interest 5 according to the invention.

For proving a suitable path for controlling the UAV the template 50 comprises a flight path 54, which already is adapted to the type of object which is represented by the template 50. Moreover, the at least two (here: three) aligning points 51-53 are defined with the template 50, which provide for scaling and orienting the template 50 according to a target coordinate system.

Now, for gathering data of the object 5 positional data, e.g. a number of reference points 10-10", is determined on basis of the map 60 (digital terrain data). This may be done manually (visually) by a user who selects the points 10-10" and thus derives respective positions of the points already being geo-referenced in an absolute (map) coordinate system, e.g. WGS84. Alternatively or additionally, the coordinates of the points 10-10" may be derived automatically based on a selection of the object 5 of interest in the map 60.

The object 5 may be embodied as a building with gable roof.

Base on the positional data 10-10" the template 50, which initially is provided in a local coordinate system (FIG. 13*b*), is transferred into the global coordinate system by solving respective transformation equations (position transformation, azimuth-rotation and scaling). The template being transferred into the global coordinate system is depicted with FIG. 13*c*. The flight path 54 thus is automatically be provided for the object 5 in suitable manner.

The template 50 (3d-model) can also be aligned by drag and drop a 2d-representation of the template 50 onto the map 60, shift it to the right position, rotate it and scale it. This step can be carried out on a PC or on a tablet in the field.

Although the invention is illustrated above, partly with reference to some specific embodiments, it must be understood that numerous modifications and combinations of different features of the embodiments can be made and that the different features can be combined with principles for image data acquisition and/or geodetic surveying systems or instruments known from prior art.

What is claimed is:

1. Method for providing information about an object using an unmanned aerial vehicle with a data acquisition unit, the method comprising:
   determining on site with a geodetic surveying instrument positional data with reference to the object, the positional data being referenced to a measuring coordinate system defined by the surveying instrument and/or in an absolute global coordinate system when the surveying instrument is already referenced thereto;
   selecting a digital template regarding the object,
      the digital template at least partly representing the object in coarse manner, wherein the digital template is embodied at least as one out of a plane, a cylinder, a sphere, a specific geometric figure, or a digital model for the object,
      and wherein for each type of object of interest a respective template, which provides an optimal flight path and positions for image acquisition for the respective object, is provided for flight planning,
   referencing the digital template with the positional data so that the digital template corresponds as to its spatial parameters to the object in the measuring coordinate system;
   deriving at least one first measuring path based on the digital template and a spatial position of at least one data acquisition point or section related to the object based on at least the positional data and/or the digital template;
   controlling the unmanned aerial vehicle in a manner such that it moves according to the first measuring path and that it approaches the at least one data acquisition point or section; and
   acquiring object information as to at least a part of the object according to the at least one data acquisition point or section by triggering the data acquisition unit depending on fulfilling a defined distance criterion, the distance criterion defining a spatial relation between an actual position of the unmanned aerial vehicle and the at least one data acquisition point or section.

2. The method according to claim 1, comprising selecting the first measuring path based on at least the referenced digital template is performed automatically.

3. The method according to claim 1, wherein the template is adaptable regarding its size and spatial orientation, wherein its spatial parameters define a spatial extension and a spatial orientation of the template, in particular height H, width W, length L, azimuthal angle and/or tilt angle.

4. The method according to claim 1, wherein the template provides object parameters being related to the type of object, wherein the object parameters provide information about a no-flight zone and/or an area of the object of particular interest.

5. The method according to claim 1, wherein referencing the template with the positional data further comprises digitally adapting a scaling and/or a spatial orientation of the template so that size and/or orientation of the template corresponds to size and/or orientation of the object in the measuring coordinate system.

6. The method according to claim 1, wherein referencing the template with the positional data further comprises fitting template positioning data with the positional data.

7. The method according to claim 6, wherein fitting the template positioning data with the positional data further comprises fitting a set of template reference points with the positional data.

8. The method according to claim 1, wherein deriving the template is based on:
a digital model for the object, and/or
a measurement of the object, and/or
determining the positional data by:
measuring positions of a set of object representing points related to the object by use of a geodetic surveying instrument, and/or
at least partly coarsely scanning the object with the geodetic surveying instrument, wherein the geodetic surveying instrument is embodied as a laser scanner.

9. The method according to claim 1, wherein:
the data acquisition unit is embodied as an image capturing unit or as scanning unit, wherein acquisition of the object information is provided by:
capturing at least one image according to the at least one data acquisition point; or
capturing at least one image sequence according to the at least one data acquisition section; or
scanning the object according to the at least one data acquisition section.

10. The method according to claim 1, wherein:
a series of data acquisition points is derived based on the referenced template, wherein a series of images is captured by means of the data acquisition unit with respect to the series of data acquisition points, wherein stereoscopic images are derived based on pairs of successive images, providing positional information of measuring points at the object, and/or
the first measuring path comprises the series of data acquisition points including the at least one data acquisition point,
wherein a point cloud is processed based on the series of images captured according to the series of data acquisition points, the point cloud representing the regions of the object covered by the images.

11. The method according to claim 1, wherein:
coarsely scanning and/or capturing a surrounding of the object and thereby providing surrounding data, the surrounding data providing information about obstacles, and
defining the at least one data acquisition point or section depending on the surrounding data.

12. The method according to claim 1, comprising:
deriving a second measuring path based on at least the referenced template, the second measuring path:
being of basically identical shape and extension compared to the first measuring path, wherein the course of the second measuring path corresponds to the course of the first measuring path,
being offset from the first measuring path in a defined manner, and
comprising further data acquisition points each of which is assigned to a respective data acquisition point of the first measuring path,
wherein a further series of images is captured by the data acquisition unit or a further image capturing unit as to the further data acquisition points of the second measuring path, wherein,
the further image capturing unit is carried by a second unmanned aerial vehicle and the second unmanned aerial vehicle being controlled in a manner such that it moves along the second measuring path, and/or
stereoscopic images are derived based on pairs of images, each pair of images is represented by a first image according to a data acquisition point of the first measuring path and a second image according to the assigned data acquisition point of the second measuring path, wherein a constant stereoscopic baseline for each pair of images is provided.

13. The method according to claim 1, wherein:
the unmanned aerial vehicle is controlled based on image processing of image data provided by an actual image of the data acquisition unit and an overview image of the object, wherein homologous features in the overview image and the actual image are derived, wherein the data acquisition unit provides real time image data and controlling of the unmanned aerial vehicle is based on the real time image data.

14. The method according to claim 1,
wherein an optical marking is generated at the object by directing a laser beam emitted from the surveying instrument to at the object.

15. The method according to claim 14,
wherein the unmanned aerial vehicle is controlled such that it approaches a defined spatial relation to the optical marking based on capturing an image with the data acquisition unit which covers the optical marking and on deriving a position of the optical marking in the captured image, wherein the optical marking provides a basis for deriving the data acquisition point or section.

16. The method according to claim 15, comprising capturing a first marking image covering the optical marking and a surrounding of the optical marking with the image capturing unit, wherein a second marking image is captured covering the optical marking and a surrounding of the optical marking, wherein a spatial position of the point at the object, which is marked by the optical marking, is determined based on the first and the second marking image.

17. The method according to claim 1, comprising continuously tracking the unmanned aerial vehicle by locking a laser beam emitted from a surveying instrument to the unmanned aerial vehicle and thereby continuously providing the actual position of the unmanned aerial vehicle.

18. A geodetic surveying system for providing information about an object, comprising:
on site in line-of-sight of the object a geodetic surveying instrument adapted to receive and provide positional data with reference to the object, the positional data being referenced to a measuring coordinate system defined by the surveying instrument and/or in an absolute global coordinate system when the surveying instrument is already referenced thereto,
a data acquisition unit for acquiring object information, and
a controlling and processing unit adapted:
to derive the at least one data acquisition point or section, and
to control acquisition of the object information, wherein:
an unmanned aerial vehicle which comprises the data acquisition unit,
a database providing a digital template regarding the object, the template at least partly representing the object in coarse manner, wherein the digital template is embodied at least as one out of a plane, a cylinder, a sphere, a specific geometric figure, or a digital model for the object,
the controlling and processing unit being adapted:
to control a movement of the unmanned aerial vehicle,
to execute a data acquisition functionality, the data acquisition functionality being at least defined by:
referencing the digital template with the positional data so that the template corresponds as to its spatial parameters to the object in the measuring coordinate system,
deriving a spatial position of at least one data acquisition point or section related to the object based on at least the positional data and/or the digital template,
controlling the unmanned aerial vehicle in a manner such that it approaches the at least one data acquisition point or section, and
acquiring object information as to at least a part of the object according to the at least one data acquisition point or section by triggering the data acquisition unit depending on fulfilling a defined distance criterion, the distance criterion defining a spatial relation between an actual position of the unmanned aerial vehicle and the at least one data acquisition point or section.

19. The geodetic surveying system according to claim 18, the unmanned aerial vehicle further comprising an inertial measuring unit.

20. The geodetic surveying system according to claim 18, the unmanned aerial vehicle further comprising at least one device selected from the list consisting of an accelerometer, tilt sensor, magnetic compass, and a gyroscope.

21. The geodetic surveying system according to claim 18, the unmanned aerial vehicle further comprising a retro-reflecting unit for reflecting a laser beam emitted from the surveying instrument.

22. A non-transitory computer program product having computer-executable instructions for controlling and executing at least the steps of:
receiving positional data of an object from a geodetic surveying instrument located on site in line-of-sight of the object, the positional data being referenced to a measuring coordinate system defined by the surveying instrument and/or in an absolute global coordinate system when the surveying instrument is already referenced thereto, and
receiving a digital template regarding the object, wherein the digital template is embodied at least as one out of a plane, a cylinder, a sphere, or a specific geometric figure, and wherein for each type of objects of interest a respective template, which provides an optimal flight path and positions for image acquisition for the respective object is provided for flight planning,
referencing the digital template with the positional data so that the digital template corresponds as to its spatial parameters to the object in the measuring coordinate system,
deriving at least one first measuring path based on the digital template and a spatial position of at least one data acquisition point or section related to the object based on at least the positional data and/or the digital template,
controlling an unmanned aerial vehicle such that it moves according to the first measuring path and that it approaches the at least one data acquisition point or section, and
acquiring object information as to at least a part of the object, based on:
continuously receiving an actual position of the unmanned aerial vehicle and/or
receiving a referenced spatial position of the unmanned aerial vehicle, the distance criterion defining a spatial relation between an actual position of the unmanned aerial vehicle and the at least one data acquisition point or section, when run on a controlling and processing unit of a geodetic surveying system.

* * * * *